US007406131B2

(12) United States Patent
Rudolph

(10) Patent No.: US 7,406,131 B2
(45) Date of Patent: Jul. 29, 2008

(54) METHOD AND ARRANGEMENT FOR DIGITAL TRANSMISSION USING AM TRANSMITTERS

(75) Inventor: Dietmar Rudolph, Berlin (DE)

(73) Assignee: Deutsche Telekom AG, Bonn (DE)

( * ) Notice: Subject to any disclaimer, the term of this patent is extended or adjusted under 35 U.S.C. 154(b) by 907 days.

(21) Appl. No.: 10/343,356

(22) PCT Filed: Apr. 10, 2002

(86) PCT No.: PCT/DE02/01314

§ 371 (c)(1), (2), (4) Date: Jan. 29, 2003

(87) PCT Pub. No.: WO02/098028

PCT Pub. Date: Dec. 5, 2002

(65) Prior Publication Data

US 2003/0148743 A1 Aug. 7, 2003

(30) Foreign Application Priority Data

May 30, 2001 (DE) ............................... 101 27 571

(51) Int. Cl.
*H04L 27/00* (2006.01)

(52) U.S. Cl. ..................................................... 375/295

(58) Field of Classification Search ................. 375/295, 375/296, 297, 298, 300, 261, 268; 330/96, 330/102, 127, 199; 381/4, 6, 15, 16; 327/50, 327/51, 52, 56, 58, 89, 96; 332/149, 150, 332/151, 159, 160, 162; 370/202, 212; 455/127.1, 455/127.2, 127.3, 122.4, 122.5, 63.1, 67.13, 455/91

See application file for complete search history.

(56) References Cited

U.S. PATENT DOCUMENTS 4,319,359 A * 3/1982 Wolf .......................... 375/238

(Continued)

FOREIGN PATENT DOCUMENTS

| | | |
|---|---|---|
| DE | 69024182 | 6/1991 |
| DE | 19911437 | 9/2000 |
| EP | 0431201 | 6/1991 |
| WO | WO-9534128 | 12/1995 |

OTHER PUBLICATIONS

Peter Senger, DRM—Digital radio mondiale—A global consortium for a new digital standard, Rundfunktech, Mitteilungen, 1999, vol. 1, pp. 29-35.

International Search Report for International No. PCT/DE02/01314 mailed on May 7, 2003.

*Primary Examiner*—Sam K Ahn
(74) *Attorney, Agent, or Firm*—Darby & Darby

(57) ABSTRACT

A method for digital transmission using an AM transmitter includes operating an output stage of the AM transmitter in a linear mode and correcting the supply voltage of the output stage in the linear mode as a function of an instantaneous drive so as to improve efficiency. The correcting is performed by operating the modulator of the AM transmitter as a switched-mode power supply unit so as to deliver a corrected supply voltage to the output stage, and scanning an envelope of a complex modulated data signal so as to control the correcting. A time constant during the scanning of the envelope enables immediate following of a rise in the envelope. The complex modulated data signal is delayed after the scanning so as to perform the correcting during the delay and prevent an overdriving of the output stage.

4 Claims, 1 Drawing Sheet

U.S. PATENT DOCUMENTS

| | | | | | |
|---|---|---|---|---|---|
| 4,626,716 | A | * | 12/1986 | Miki | 327/270 |
| 5,249,201 | A | | 9/1993 | Posner et al. | 375/59 |
| 5,708,681 | A | | 1/1998 | Malkemes et al. | 375/297 |
| 5,880,633 | A | * | 3/1999 | Leizerovich et al. | 330/84 |
| 6,049,703 | A | | 4/2000 | Staudinger et al. | |
| 6,314,142 | B1 | * | 11/2001 | Perthold et al. | 375/296 |
| 6,349,216 | B1 | * | 2/2002 | Alberth et al. | 455/550.1 |
| 6,449,465 | B1 | * | 9/2002 | Gailus et al. | 455/126 |

* cited by examiner

METHOD AND ARRANGEMENT FOR DIGITAL TRANSMISSION USING AM TRANSMITTERS

CROSS-REFERENCE TO RELATED APPLICATIONS

This application is a U.S. National Stage Application under 35 U.S.C. §371 of PCT International Application No. PCT/DE02/01314, filed Apr. 10, 2002, which claims priority to German Patent Application No. 101 27 571.4, filed May 30, 2001. Each of these applications is hereby incorporated by reference as if set forth in its entirety.

BACKGROUND

The present invention relates generally to the field of broadcast transmitters which will be converted from analog amplitude modulation (AM) to digital modulation as digitalization moves forward, and particularly to a method for digital transmission using AM transmitters.

In this context, the intention is for the hitherto usual transmitter types, non-linear AM transmitters featuring an RF input (radio frequency) and an audio input, to continue in use. The reasons for this are as follows:

- AM transmitters internally operate in switched mode and therefore have efficiencies which are better by a factor of 3 than those of linear transmitters which are otherwise usually used for digital transmission, for example, in the case of DAB (Digital Audio Broadcasting) and DVB (Digital Video Broadcasting). This results in a saving of operating costs.
- it is easier to convince broadcasters to convert from analog to digital if no great investments come up in the preliminary stages.

The digitalization of AM broadcasting is seen as the only chance to preserve these frequency ranges and the technology used therein in the long term. For implementation purposes, the consortium "Digital Radio Mondiale" was founded, see "Rundfunktechnische Mitteilungen" [Broadcasting Newsletter], 43rd year, 1999, issue 1, pages 29-35.

The use of a non-linear AM transmitter for digital modulation requires a special operating mode of the transmitter. The modulated digital signal is generated by two partial signals (I and Q), which are orthogonal to each other. The I-signal ("in phase") is modulated onto a cosine oscillation having the frequency Ft (carrier frequency). The Q-signal ("quadrature") is modulated onto a sine oscillation having the same frequency Ft. The sum of both modulated oscillations produces the complex modulated data signal (cosine 0 180 degrees, sine 90-+90 degrees). The modulated I/Q-signal is shaped by filters in such a manner that it has exactly the prescribed curve shape with the desired bandwidth.

For non-linear operation, it is required for the modulated I/Q-signal to be converted in such a manner that two signals, an amplitude signal (A-signal) and a phase-modulated carrier signal (RF-P), result therefrom that are suitable for proper control of the AM transmitter. Then, at the output of the AM transmitter, the modulated I/Q-signal is generated again with higher power.

The modulated I/Q-signal corresponds to a Cartesian representation. The Cartesian representation is converted to a polar representation with amplitude and phase. In this manner, the amplitude signal (A-signal) is obtained to control the AM transmitter at the audio input. A phase-modulated radio frequency (RF-P signal) is generated from the initially resulting phase signal (P-signal). Advantageously, the RF-P signal can also be directly obtained without the intermediate step via the P-signal. In this manner, the signals are obtained that are required for controlling the AM transmitter:

- amplitude signal (A-signal)
- phase-modulated RF signal (RF-P signal)

The A-signal is fed into the modulator input (audio input) of the AM transmitter, and the RF-P signal is used for HF-type control of the transmitter. In the transmitter output stage, the two signals A&RF-P are multiplicatively combined, forming the high frequency digital output signal.

Due to the required conditioning process, both the A-signal and the RF-P signal obtain far larger bandwidths than the one the digital signal originally had and is intended to have again at the output of the transmitter.

Older modulators are frequently not able to provide the increased bandwidths (factor 3-5) because they were not designed for this. When using only the limited bandwidth that "older" transmitters have available in the modulator section, then this results in considerable out-of-band and spurious emissions. These have the property that they have only a very small gradient in the spectrum and therefore interfere with quite a number of adjacent channels.

Moreover, the spurious emissions generally lie above the limits that are coordinated by the ITU so that approval appears to be uncertain.

SUMMARY OF THE INVENTION

Non-linear distortions are particularly problematic when the intention is to transmit multicarrier signals, for example, OFDM (Orthogonal Frequency Division Multiplexing) signals, as digital modulation.

In the case of the DRM system (Digital Radio Mondiale) for digital transmission in the AM bands, which is currently recommended by the ITU for standardization, an OFDM technique using approximately 200 carriers is proposed as multicarrier technique.

Multicarrier modulations indeed have a nearly rectangular spectrum but feature a noise-like character in the time domain, namely both for the I-component and for the Q-component of the time signal. This is a result of the superposition of many statistically virtually independent subchannels that occurs in the process. According to the rules of the "Central Limit Theorem", such a superposition has a distribution density function of the amplitude values, both of the I-component and of the Q-component, which nearly reaches the shape of a Gaussian bell-shaped curve. In such a case, the distribution density function of the amplitude values of the composite signal has the shape of a Rayleigh distribution. This means that small and medium amplitude values occur quite frequently whereas high amplitude values occur very rarely.

If the amplitude signal of an AM transmitter which is operated in this non-linear mode is amplitude-limited, then non-linear distortions occur which, on one hand, result in increased out-of-band and spurious emissions and, on the other hand, also cause inband interference which can be considerably higher than the out-of-band and spurious emissions due to the operating mode of the transmitter. The inband interference reduces the attainable coverage area since an already inherently noisy signal can tolerate less disturbances in the radio channel to get to a critical threshold at the receiver.

An object of the present invention is to provide a method and arrangement for digital transmission using conventional AM transmitters by which unwanted emissions due to non-linear distortions are to a large extent avoided.

The present invention provides a method for digital transmission using an AM transmitter. The method includes: operating an output stage of the AM transmitter in a linear mode and correcting a supply voltage of the output stage in the linear mode as a function of an instantaneous drive so as to improve an efficiency. The correcting is performed by: operating a modulator of the AM transmitter as a switched-mode power supply unit so as to deliver a corrected supply voltage to the output stage; and scanning an envelope of a complex modulated data signal so as to control the correcting, a time constant during the scanning of the envelope enabling an immediate following of a rise in the envelope. The complex modulated data signal is delayed after the scanning so as to perform the correcting during the delay and prevent overdriving of the output stage.

Non-linear distortions can be prevented if the operating point of the transmitter is shifted such that a linear mode of operation arises. For linear operation, the transmitter output stage is driven by the complex modulated data signal (I/Q-signal), as is known from the digital systems DAB and DVB.

The linear operation of the transmitter is advantageous with respect to the spurious emissions. These have spectrally much larger gradients than in the previously described non-linear mode which will allow compliance with the ITU spectrum mask combined with a good alignment of the transmitter. Only the efficiency of the transmitter is very low in linear operation, causing high costs of electricity.

The efficiency during linear operation of the AM transmitter is so poor because the full supply voltage is applied to the transmitter output stage even when the drive of this stage is low, and because power is converted to heat due to the quiescent current of the transmitter output stage. An improved efficiency can be achieved by making the supply voltage not much larger than required by the instantaneous drive of the output stage.

DETAILED DESCRIPTION

Figure 1:
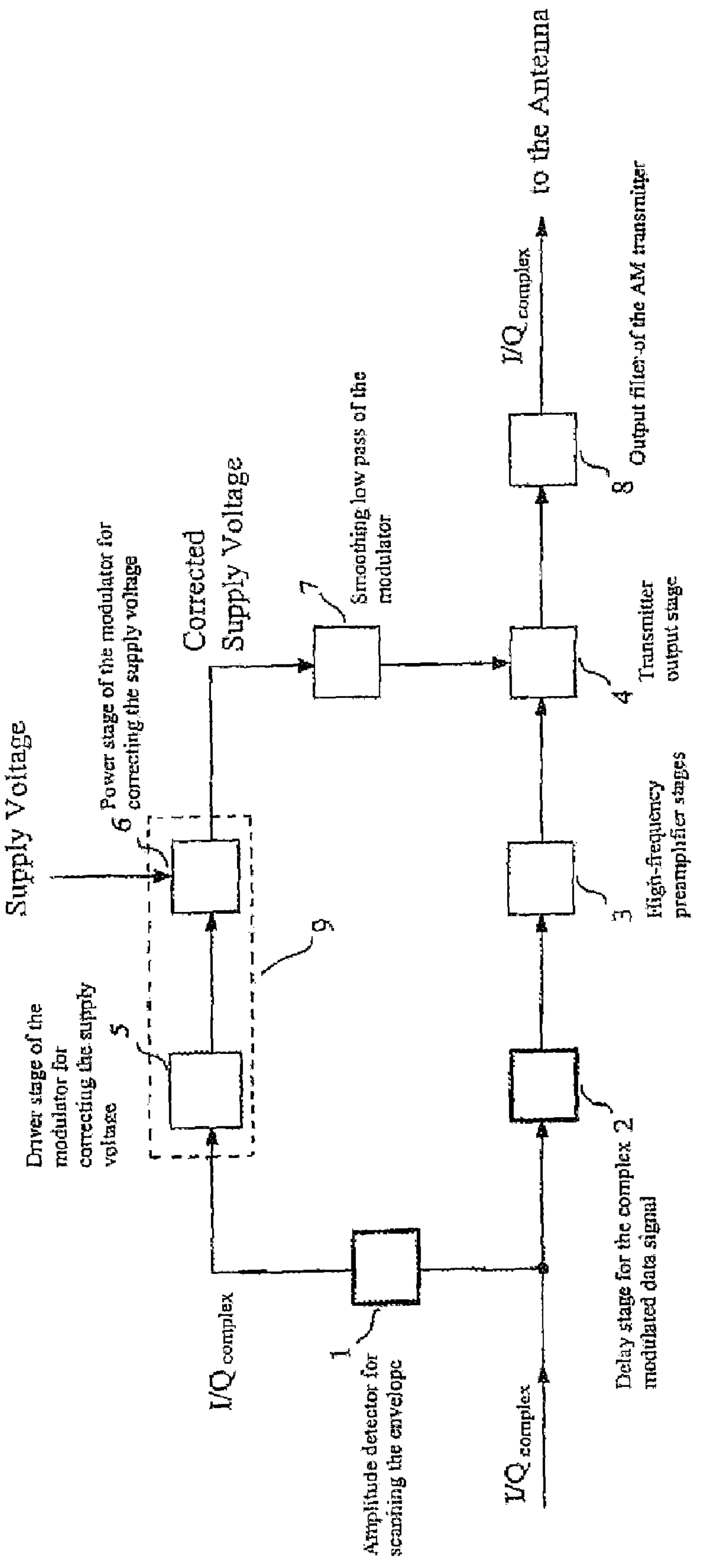
FIG. 1 shows a block diagram of a method for digital transmission using an AM transmitter.

Referring to FIG. 1, to collect the supply voltage for transmitter output stage 4 as a function of the instantaneous drive, the envelope of the complex modulated data signal is scanned by amplitude detector 1 (envelope rectifier or peak rectifier) and the supply voltage or anode voltage of the output stage is controlled by modulator 9, which operates as a switched-mode power supply unit. Modulator driver stage 5 corrects the supply voltage at modulator power stage 6, the corrected supply voltage being smoothed in modulator smoothing low pass 7.

It is important that no overdriving occur within the framework of the correction, not even for a short period of time. Overdrive could occur in that the envelope of the digital signal increases faster than is achieved by the correction of the supply voltage. As a rule, this assumption has to be made since the modulator does not have the required bandwidth.

This disadvantage can be eliminated in that the complex digital signal, subsequent to scanning its envelope, is delayed in delay stage 2, prior to being amplified in high frequency preamplifier stages 3, in such a manner that the supply voltage of transmitter output stage 4 can be corrected in the meantime. The complex digital signal is then filtered in transmitter output filter 8. The amplitude detector and the delay stage have to be retrofitted into AM transmitter on the occasion of the conversion to digital operation (see FIG. 1).

The time constant of the envelope detector must be such that it is possible to immediately follow a rise in the envelope so that no overdriving occurs with the distortions and spurious emissions resulting therefrom. However, other than is usual, for example, with "dynamic amplitude modulation", the time constant for the decay can be selected to be exactly as large as for the rise because here it is not required to consider the "auditory impression". The smaller decay time constant increases the efficiency of the transmitter further.

Transmitters which operate with pulse duration modulation (PDM) or with pulse step modulation (PSM) have such modulators in the form of switched-mode power supply units. The voltage obtained from the scanned envelope of the digital signal is used for controlling these PDM or PSM modulators, thereby exactly achieving the correction of the supply voltage for the transmitter output stage according to the envelope of the digital signal. Thus, both objectives are achieved: linear operation and increase of the efficiency of the transmitter to an acceptable value.

What is claimed is:

1. A method for digital transmission using an amplitude modulation (AM) transmitter comprising:

operating an output stage of the AM transmitter in a linear mode;

correcting a supply voltage of the output stage in the linear mode as a function of an instantaneous drive so as to improve an efficiency, the correcting being performed by:

operating a modulator of the AM transmitter as a switched-mode power supply unit so as to deliver a corrected supply voltage to the output stage; and scanning an envelope of a complex modulated data signal so as to control the correcting, a time constant during the scanning of the envelope enabling an immediate following of a rise in the envelope; and delaying, after the scanning, the complex modulated data signal so as to perform the correcting during the delaying so as to prevent an overdriving of the output stage.

2. The method as recited in claim 1 wherein the overdriving is a short-duration overdriving.

3. The method as recited in claim 1 wherein the time constant during the scanning is equal for a rise and a decay of the envelope.

4. The method as recited in claim 1 wherein the modulator is at least one of a pulse duration modulator and a pulse step modulator.

* * * * *